United States Patent [19]

Boyle et al.

[11] 4,279,700
[45] Jul. 21, 1981

[54] TRITIUM REMOVAL AND RETENTION DEVICE

[75] Inventors: Raymond F. Boyle, Pittsburgh; Docile D. Durigon, North Huntingdon, both of Pa.

[73] Assignee: Westinghouse Electric Corp., Pittsburgh, Pa.

[21] Appl. No.: 950,359

[22] Filed: Oct. 11, 1978

Related U.S. Application Data

[63] Continuation of Ser. No. 741,924, Nov. 15, 1976, abandoned, which is a continuation of Ser. No. 621,975, Oct. 14, 1975, abandoned.

[51] Int. Cl.³ .............................................. G21C 3/02
[52] U.S. Cl. ....................................... 176/68; 176/76; 176/78
[58] Field of Search ........................ 176/68, 76, 78, 79

[56] References Cited

U.S. PATENT DOCUMENTS

| | | | |
|---|---|---|---|
| 3,647,623 | 3/1972 | Hepps et al. | 176/79 X |
| 3,679,545 | 7/1972 | Leirvik | 176/79 X |
| 3,742,367 | 6/1973 | Grossman | 176/68 X |
| 3,804,708 | 4/1974 | Nilson | 176/68 X |
| 3,988,075 | 10/1976 | Penrose et al. | 176/78 |
| 4,011,133 | 3/1977 | Bloom et al. | 176/68 |
| 4,022,622 | 5/1977 | Gordon et al. | 176/68 X |
| 4,029,545 | 6/1977 | Gordon et al. | 176/78 X |
| 4,045,288 | 8/1977 | Armijo | 176/78 X |
| 4,046,631 | 9/1977 | Clapham | 176/79 |
| 4,121,972 | 10/1978 | Steven | 176/78 |

FOREIGN PATENT DOCUMENTS 2421295  5/1973  Fed. Rep. of Germany.

Primary Examiner—Peter A. Nelson
Attorney, Agent, or Firm—Edward L. Levine; Z. L. Dermer

[57] ABSTRACT

Apparatus comprising a two layered composite with an internal core of zirconium or zirconium alloy which retains tritium, and an adherent nickel outer layer which acts as a protective and selective window for passage of the tritium.

9 Claims, 7 Drawing Figures

TRITIUM REMOVAL AND RETENTION DEVICE

This is a continuation of application Ser. No. 741,924, filed Nov. 15, 1976, which is a continuation of application Ser. No. 621,975, filed Oct. 14, 1975, both of which are now abandoned.

BACKGROUND OF THE INVENTION

1. Field of the Invention

This invention provides a device to remove and store tritium from a gaseous medium, and a method for manufacturing the device. It specifically provides a device which may be incorporated in a fuel rod of a nuclear reactor to minimize release of tritium to the reactor coolant.

2. Description of the Prior Art

The operation of a nuclear reactor necessarily forms tritium. As a product of ternary fission, which is typically the largest source of tritium, tritium is formed within the solid matrix of uranium containing pellets and other fuels, typically encased in metal tubes or cladding. Most water reactors utilize fuel cladding of zirconium alloy, known more commonly as Zircaloy, and a typical commercial reactor includes thousands of such rods. The properties of typical zirconium alloys are defined in ASTM Standard B 353-71, "Wrought Zirconium and Zirconium Alloy Seamless and Welded Tubes for Nuclear Service." After formation of tritium in the solid fuel pellet matrix, the gaseous tritium may diffuse through the pellet matrix and into the void volume between the fuel pellets and fuel cladding, as do a variety of other fission product gases. These fission product gases are then free to migrate throughout the fuel rod, and contribute to a pressure buildup within the cladding. The tritium, and other fission product gases, circulate inside the fuel rod due to convection. A typical fuel rod includes a plenum area at top of the rod, where, due to the free volume, these gases tend to collect.

Although the radioactivity emitted by tritium is a weak beta emission, and although it has a relatively short biological half-life (ten days), tritium has a relatively long radioactive half-life (twelve years). Also, tritium will readily diffuse through most materials, including materials such as zirconium, alloys of zirconium, and stainless steel, which are typically used as fuel rod cladding. Because pressurized water reactors in operation today utilize boric acid in the coolant for power level control, tritium is also formed within the reactor coolant itself. Once tritium reacts with water to form HTO, it is technically difficult and very costly to separate.

Regulatory authorities have therefore placed stringent restrictions on allowable releases of tritium to the environment. One way to lower the tritium inventory in the reactor coolant, and hence the amount of tritium which may be discharged to the environment, it to provide a means within each fuel rod to specifically collect and store the tritium produced within the fuel pellets which diffuses into the void volume. This invention provides such means, which further are easily removable from the fuel rod during reprocessing. As tritium is widely used as a tracer element and in the medical and other fields, being able to simply and less expensively recover the tritium, as compared to recovery from an aqueous solution, is a further benefit provided by this invention. The device disclosed herein also may be utilized in other functions within a nuclear plant, as well as in other applications where it is desirable to remove tritium from a gaseous medium.

Although many systems and modes of operation have been used and proposed to control tritium subsequent to its entering the reactor coolant, in accordance with this invention tritium is specifically collected and controlled within the fuel rod itself. This invention, in the preferred embodiment, does so by means of a device consisting of an inner core of zirconium or alloys of zirconium, covered on all surfaces with an adherent layer of nickel, which nickel layer acts as a selective and protective window for the passage of tritium. At reactor operating temperatures, the layer of nickel is generally unreactive to species in the fuel rod environment, including any high temperature moisture present. The nickel layer, however, is selectively permeable to tritium, also allowing passage of such atomically small and available isotopes as hydrogen and deuterium. Once through the adherent nickel layer, the tritium reacts with the inner core of zirconium alloy to form a solid solution or hydride, and is fixed within the zirconium alloy matrix until such time as it is desirable to remove the tritium.

Other devices have been disclosed which may perform a somewhat similar function, although of different design and without the tritium selectivity provided by the device of the instant invention. A United States patent issued to L. N. Grossman, U.S. Pat. No. 3,742,367, June 1973, discloses a non-destructive detection process for nuclear fuel rods. The Grossman patent provides, in part, a device consisting of a homogeneous alloy of titanium, zirconium, and nickel, as differentiated from the layered window of nickel over a zirconium alloy core of this invention. An amount of the alloy of the Grossman patent is placed in the fuel rod during assembly. The assembled rod is then heated prior to installation in the reactor, to vaporize moisture, and free from the fuel pellet matrix gases such as hydrogen, oxygen, nitrogen, carbon monoxide, and carbon dioxide which react with the alloy. The alloy within the rod is then examined by neutron radiography to detect metallic hydrides prior to putting the fuel rod into operation in a reactor. Detection of moisture provides an indication that sufficient heating of the fuel has occurred to remove moisture from the fuel pellets. This reaction of the named elements and compounds with the homogeneous alloy is designed to occur to eliminate subsequent embrittlement and induced stresses in the cladding during reactor operation. Since the homogeneous alloy of the Grossman patent is reactive with hydrogen, it should also be reactive with tritium released during reactor operation.

However, it is seen that significant differences exist between this invention and the teachings of the Grossman patent. Most notably, these distinctions include differences in elemental composition and in the methods of joining the elements. The prior art device consists of titanium, zirconium, and nickel, compared to a nickel coated zirconium alloy of this invention. More important, the prior art forms these elements into a homogeneous alloy, with the reactions taking place on the surface and within the alloy. This invention, on the other hand, provides a two-layered composite device, containing zirconium or zirconium alloy as an internal core and a layer of nickel on the exterior. The device disclosed herein is much more selective as to what will pass through the nickel layer or window and react inside the device with zirconium alloy. Additionally, the prior art alloy is used to remove moisture and other impurity gases from a fuel rod prior to reactor operation, whereas the device disclosed herein performs its function subsequent to reactor startup and during the life of the fuel rod. The device disclosed herein further has significant benefits in terms of tritium recovery and separation subsequent to reactor operation.

SUMMARY OF THE INVENTION

This invention provides a device for removing and retaining tritium from a gaseous medium, and also a method of manufacturing the device. The device, in the preferred embodiment, consists of an inner core of zirconium alloy, desirably an alloy known commonly as Zircaloy-4, and an outer adherent layer of nickel which acts as a selective and protective window for passage of tritium. The tritium then reacts with or is absorbed by the zirconium alloy, and is retained until such time as it is desirable to remove it during reprocessing. In the main embodiment, a small elongated annular shaped device is incorporated within a retention spring in the upper plenum of a nuclear fuel rod, such that it will remove tritium formed within the rod during the fissioning process which migrates outside the fuel pellet matrix.

BRIEF DESCRIPTION OF THE DRAWINGS

The functions and advantages of this invention will become more apparent from the following description and accompanying drawings, in which.

DESCRIPTION OF THE PREFERRED EMBODIMENTS

During the operation of a nuclear reactor tritium is formed. Once tritium forms HTO in the reactor coolant, it is technically difficult and economically costly to separate. Also, there are stringent regulatory restrictions today which limit the release of tritium to the environment. For these reasons, it is highly desirable to minimize the amount of tritium combining with the reactor coolant. In all nuclear reactors, tritium is produced as a byproduct of ternary fissions. This is the largest source of tritium production in many reactors. It is also formed as a product of other reactions, such as reactions with boron-10, lithium-6 and lithium-7, and deuterium.

Figure 1:
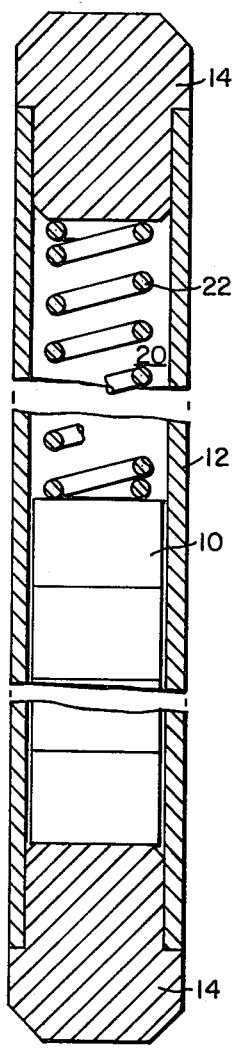
FIG. 1 is a simplified schematic, in cross section, of a fuel rod.

As the largest source of tritium production is within the fuel itself, typically comprising uranium, or plutonium, or thorium, among others, it is desirable to remove the tritium by means in close proximity to this source. A typical form of nuclear reactor fuel is a stack of solid sintered pellets 10 of uranium dioxide encased in a sealed metal cladding 12, as shown in FIG. 1. End plugs 14 hermetically seal the cladding 12 at the top and bottom. The most widely used cladding materials are stainless steel and alloys of zirconium, such as Zircaloy-4. Tritium is formed in the fuel pellet 10 matrix, and migrates in a gaseous phase to the void volume between the cladding 12 and the pellets 10. Because of its small atomic size, a significant portion of the tritium in the void may diffuse through the fuel rod cladding 12, and into the reactor coolant. Also, tritium may react to replace hydrogen atoms in the fuel cladding 12 or react with the cladding 12. It has been found that tritium diffuses through stainless steel in a reactor environment at a high rate, the rate being significantly higher than its diffusion through zirconium alloys. Tritium also reacts with the zirconium alloy cladding to form an hydride, lessening the release of tritium to the reactor coolant. An ideal device which will remove and store this ternary produced tritium should have the following characteristics: (1) it should remove and store tritium in a gas phase within a fuel rod during the operating life of the rod, (2) the removal function should not be limited by residual air, water vapor, or other gases normally present in fuel rods, such as CO, $CO_2$ and $CH_4$, among others, (3) it should reduce the reaction of tritium with the rod cladding, (4) it should be inexpensive to manufacture as compared to the cost associated with dealing with excess tritium in the reactor coolant, (5) the device should be easily adaptable to current and future fuel rod designs, and (6) it should provide a relatively inexpensive source of tritium during fuel reprocessing, as compared to removal of tritium from an aqueous solution, for medical, tracer and other uses.

Figure 3:
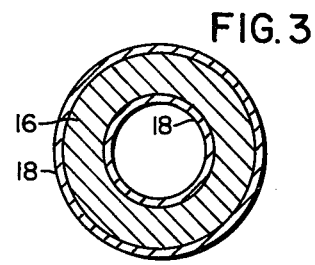
FIG. 3 is a view, in cross section, taken at III—III of FIG. 2.
Figure 2:
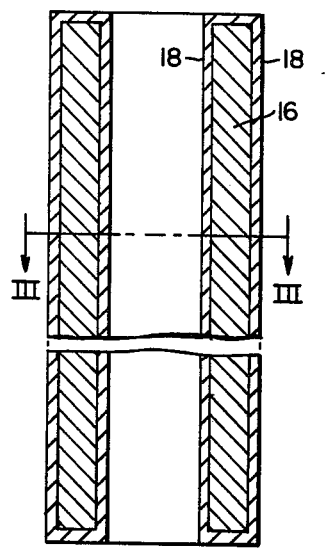
FIG. 2 is an elevation view, in cross section, of a tritium removal and storage device.

The apparatus disclosed herein meets all of these characteristics. The apparatus, for use in a fuel rod, consists of a two-layered composite of materials, and can be produced in almost any geometric shape desired. The inner core 16 (FIGS. 2 and 3) can be a number of materials, as long as the material meets the criteria of removing tritium in a gaseous phase within a reactor environment and retaining it through absorption or chemical reaction until such time as it is specifically desired to remove the tritium. Tests performed and discussed below were based upon an inner layer of zirconium alloy, such as Zircaloy-4 which is the preferred material of the inner core 16. Pure zirconium, as well as other zirconium alloys such as Zircaloy-2, among others, may also be used. The outer layer 18 of the device is an adherent layer of nickel bonded to the inner core 16. The nickel layer 18 acts as a selective and protective barrier and allows passage of tritium as well as hydrogen and deuterium, at reactor operating temperatures. In a higher temperature environment, other materials, such as dissociated hydrocarbons, could pass through the nickel window if a sufficient quantity of these materials were available. Tests have shown, for the size device necessary for incorporation in fuel rods, on the order of 1.5 grams, that the nickel window should constitute roughly five to twenty percent by weight of the device, with a more ideal range between eight and twelve percent by weight. The nickel should be evenly distributed over all surfaces of the inner core 16, such that about four to six percent by weight is on each side of the inner core 16. Below this level, experimental results have shown that the removal rate is lessened. It further may allow buildup of an oxide layer on the device which also partially poisons its tritium removal function. This poisoning would be the effect if only a surface of zirconium alloy were placed inside the fuel rod, without the overlaying protective nickel window. Although the apparatus will function above the preferred weight percent level, to increase reactor efficiency, it is desirable to minimize the amount of neutron poisoning material in the reactor core. As there are typically in excess of 20,000 fuel rods in a typical reactor, even a small device in each rod will have an effect on neutron absorption. It is therefore preferable not to exceed the eight to twelve percent by weight level. For the device for use in a fuel rod, an inner core 16 of thickness between 0.01 and 0.03 inch will be consistent with an outer layer of eight to twelve percent by weight. It should be noted that if the inner core is not completely covered with a nickel layer, the device will still operate to perform its removal function, but with decreased efficiency.

Since the device consists of two adherent layers, the bonding of these layers is critical, and must be carefully controlled in manufacturing. The heat treatment is crucial. The method disclosed herein includes cleaning the surface of the inner layer of zirconium alloy to nuclear specifications. Allowable impurity levels of the zirconium alloy are as typically standard in the industry for fuel rods, and are defined in ASTM V-353. Subsequent to cleaning, high purity nickel is deposited upon the surface of the inner layer by commercially well known manufacturing techniques. These techniques may include electroplating, vacuum deposition, or a liquid dip technique, among others, as long as the amount of the deposit is controlled. Controlled sputtering techniques may also be used. Subsequently, the zirconium alloy core 16 with nickel deposit 18 is thermally treated in a vacuum maintained at about $10^{-6}$ millimeters of mercury. It is heated to a temperature between 775° C. and 825° C., and maintained for a minimum of three hours. It should not be heated more than several hours beyond this amount of time. This treatment activates the surfaces of the zirconium alloy by diffusion of the nickel into the zirconium alloy surface. This thermal vacuum implantation provides the protective and selective layer of nickel 18, which is, as shown by testing discussed in the examples below, unreactive in the presence of water vapor and fission product gases, but permeable to tritium, hydrogen, and deuterium in a reactor environment. The time and temperature relation of the heat treatment is critical as an excess of either would allow the material to form an homogeneous alloy, and an insufficiency would not provide sufficient bonding. As discussed above, an alloy would be poisoned by the other available gases within a fuel rod, thereby limiting its tritium removal and storage function.

Among the prime characteristics desired of a tritium removal and storage device for use in a nuclear fuel rod is that it does not add significant costs to the manufacturing process, and that it does not in any way adversely affect reactor operation. An apparatus as hereafter described provides such desirable results.

Figure 4:
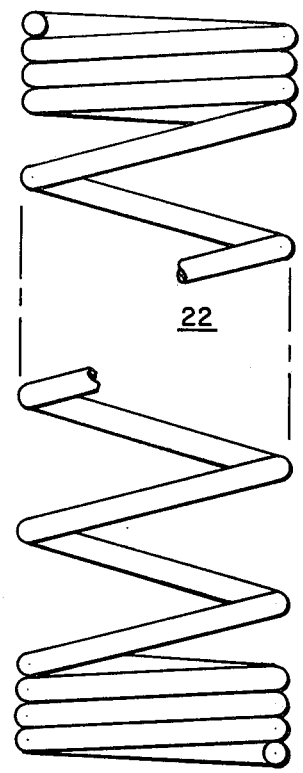
FIG. 4 is an elevation view of a spring used in the upper plenum of a fuel rod.
Figure 5:
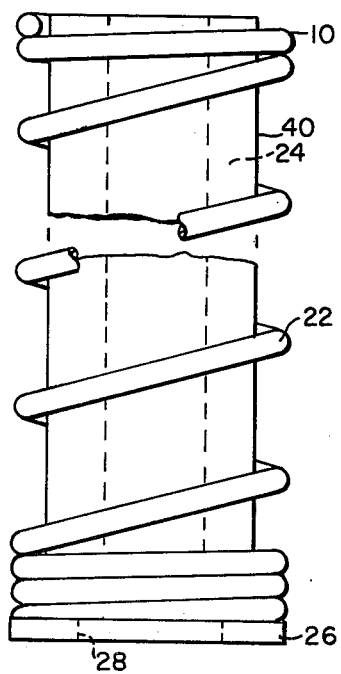
FIG. 5 is an elevation view of the device of FIG. 3 contained within the spring of FIG. 4.

Most fuel rods of the type discussed include a void plenum 20 (FIG. 1) in the fuel rod, typically in the upper regions to allow for the buildup of fission product gases. The plenum 20 area may also be used for inclusion of mechanical components, most notably a retention spring 22 (FIG. 4) or other retention device to maintain proper axial position of the fuel pellet 10 stack and allow for fuel axial expansion. An elongated annular shaped tritium removal and storage device 24 may easily be placed within the spring 22, as shown in FIG. 5, and function to remove and store ternary fission produced tritium during the operating life of the fuel. The device 24 shown is approximately two inches in length with a 0.2 inch outer diameter and a 0.03 inch wall thickness. This device 24 may be placed within the spring 22 in a fuel rod without complication, during fuel manufacture. A typical spring 22 as used in pressurized water reactor fuel rods is approximately seven inches long with a 0.35 inch outside diameter and a 0.22 inch inside diameter. An end cap 26 affixed to one or both ends of the spring 22 to retain the device 24 in the plenum 20 area may also be used. It may be a stainless steel disc with, or without, a central aperture 28 to provide a free path for transport of tritium to the device 24. For example, the device 24 may be placed inside the spring 22 and then two end caps 26 spot welded to each end of the spring 22. The spring 22 would then be placed in the fuel rod as is presently done, with perhaps the added step of mere visual inspection to ascertain that each spring 22 does contain a tritium removal device 24. Alternatively, the device 24 could be placed above the spring 22, or in rods not using a spring or other retention device, it could be placed in the plenum with means, such as a small plate, separating the device 24 from immediate contact with the fuel pellets 10.

In accordance with the invention, a series of tests were performed to ascertain the ability of the invention to remove and store tritium. The tests were arranged to simulate a reactor environment, including placing a tritium removal and retention test device in competition with the zirconium alloy cladding for the tritium. Early tests also simulated the ability of the invention for tritium removal and retention in competition with several other mediums.

It should be noted that in all of the tests, deuterium, which can be more easily obtained, was used as opposed to tritium, which is a typical laboratory technique. Deuterium is easier to work with in a laboratory environment and posed less of a health concern than would tritium. Tritium and deuterium are similarly sensitive to surface barriers and isotopic exchange reactions. Also, well recognized in the art, is that similar recovery and detection techniques may be used for tritium and deuterium. As among any isotopes of a given element, the kinetic relationships of tritium and deuterium are similar. Further, briefly stated, the diffusion coefficient of deuterium and tritium through materials as taught herein is similar, with tritium having a somewhat lower coefficient than deuterium.

EXAMPLE I

Figure 6:
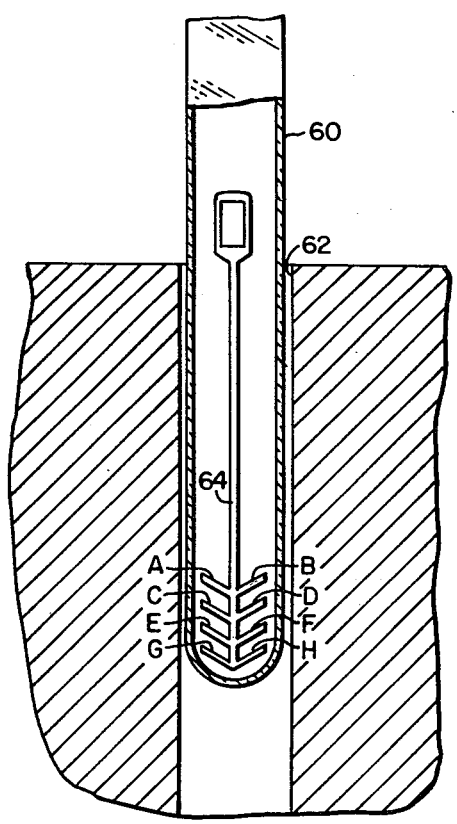
FIG. 6 is a schematic of a test furnace.

The first laboratory test involved a competition among eight differing devices. All of the samples were of similar mass. They were cleaned with acetone and then dried and weighed prior to being inserted into a quartz furnace tube 60 (FIG. 6). The samples were either in a thin foil sheet form, approximately 10 mils thick, or powders, as noted below, and the Zircaloy-4 cladding samples were cuts from actual fuel cladding. The powders were contained in high purity platinum crucibles which, when subsequently analyzed, had essentially no deuterium content. The furnace tube was then evacuated, and placed in a furnace 62. The eight samples were suspended within the tube 60 by a quartz sample holder 64. The samples were then heated to 650° C. while the gas pressure was observed and the furnace 62 composition analyzed by mass spectrometry. When the gas atmosphere in the furnace 62 showed little or no change, the furnace 62 temperature was reduced. When the temperature of the furnace tube 60 reached 310° C., deuterium gas at a pressure of 1.4 millimeters of mercury was added to the furnace tube 60, corresponding to about 1.2 cubic centimeters. The pressure was monitored continuously by a metal capacitance manometer and gradually decreased to 0.44 millimeters of mercury after forty-two hours. The furnace 62 was then cooled to room temperature and mass spectrometric analysis performed on the gas atmosphere. It showed that 0.16 cubic centimeters of deuterium remained in the system. The samples were then weighed, the dueterium extracted from each sample by a hot vacuum extraction technique and mass spectrometry analysis. This involved heating each sample to about 1050° C., which is above the temperature range (800° C.–850° C.) at which hydrogen and its isotopes dissociate from zirconium and Zircaloy-4. The amount of deuterium was quantitatively determined by mass spectrometry. Before each experiment discussed herein, the experimental system was calibrated with National Bureau of Standards (NBS) Hydrogen Standards.

The results are shown in Table I. The letters "A" through "H" representing each sample correspond to the letters on FIG. 6 showing the relative location of the samples in the furnace tube 60. Sample "A" represents a zirconium-titanium powder, with 6.2% by weight nickel; sample "B" a zirconium-titanium powder with a 3.9% by weight nickel; samples "C" and "D" were Zircaloy-4 cladding; sample "E", as discussed herein, a Zircaloy-4 core with a 5.7% by weight outer nickel layer; sample "F" a zirconium metal core with a paladium outer layer; sample "G" a zirconium-titanium alloy with a paldium coating, and sample "H" a zirconium core with a ten weight percent vanadium coating.

As shown from the three data columns of Table I, the Zircaloy-4 core with a nickel outer layer proved far superior to the other samples in removing and retaining the deuterium, even in competition with a wide variety of other samples:

TABLE 1

| Sample | $D_2$ (ppm) | $D_2$ (cc) | $D_2$ (cc/gm sample) |
|---|---|---|---|
| A | 747 | .2487 | 4.180 |
| B | 669 | .2120 | 3.744 |
| C | 4.8 | .0056 | .026 |
| D | 2.9 | .0032 | .016 |
| E | 2243 | .5286 | 12.556 |
| F | 11.5 | .0058 | .064 |
| G | 34.2 | .0102 | .191 |
| H | 2.8 | .0036 | .016 |

EXAMPLE II

A second competition test was run, using the same experimental procedure as discussed in reference to Example I. Among the samples here, however, were included three comprising cores of Zircaloy-4, with varying weight percentage nickel outer layers. Samples "B-2", "C-2", and "E-2" comprised a ten (10%) percent, a 5.7%, and a 3.3% nickel layer, respectively. Sample "A-2" was Zircaloy-4 cladding material; sample "D-2" a zirconium-titanium powder with 6.2 weight percent nickel; sample "F-2" a zirconium-titanium powder with 3.9 weight percent nickel; sample "G-2" Zircaloy-4 in a thin foil (0.005" thick) form; and sample "H-2" Zircaloy-4 cladding material.

TABLE II

| Sample | $D_2$ (ppm) | $D_2$ (cc) | $D_2$ (cc/gm sample) |
|---|---|---|---|
| A-2 | 1.2 | .0013 | .0067 |
| B-2 | 122 | .0293 | .6832 |
| C-2 | 45.1 | .0123 | .2526 |
| D-2 | 4.6 | .0018 | .0258 |
| E-2 | 2.4 | .0006 | .0134 |
| F-2 | 2.3 | .0007 | .0129 |
| G-2 | 11.2 | .0026 | .0627 |
| H-2 | 0.6 | .0007 | .0034 |

As shown from Table II, the samples including an inner core of Zircaloy-4 and outer layers of nickel did quite well in dueterium adsorption. Further, it is most evident that the dueterium removal ability significantly increased with increasing weight percentage of nickel.

EXAMPLE III

A third competition test was run, utilizing the same procedure, and again the Zircaloy-4 core with a ten weight percent nickel outer layer showed far superior. In Table III, sample "A-3" was Zircaloy-4 cladding; "B-3" Zircaloy-4 foil with a ten percent nickel outer layer; sample "C-3" zirconium-titanium powder with 7.75 weight percent copper; sample "D-3" zirconiumtitanium powder with 12.1 weight percent nickel; sample "E-3" zirconium-titanium powder with twelve weight percent copper; sample "F-3" zirconium-titanium powder with 6.5 weight percent nickel; sample "H-3" Zircaloy-4 foil; sample "I-3" Zircaloy-4 cladding.

TABLE III

| Sample | $D_2$ (ppm) | $D_2$ (cc) | $D_2$ (cc/gm sample) |
|---|---|---|---|
| A-3 | 0.9 | .001 | 0.005 |
| B-3 | 407 | .100 | 2.279 |
| C-3 | 29 | .003 | 0.160 |
| D-3 | 57 | .008 | 0.319 |
| E-3 | 11 | .002 | 0.062 |
| F-3 | 19 | .003 | 0.106 |
| H-3 | 17 | .003 | 0.095 |
| I-3 | 1 | .001 | 0.006 |

EXAMPLE IV

A fourth competition test was similar to those discussed above. Here, however, all the samples were annealed at 660° C. for fifteen hours in a vacuum before the deuterium pressure addition. Again, the Zircaloy-4 with a ten percent by weight nickel outer layer proved by far to be superior, and the adsorption significantly increased. Sample "A-4" was a Zircaloy-4 cladding sample; sample "B-4" the Zircaloy-4 with nickel outer layer; sample "C-4" a zirconium-titanium powder with 7.75 weight percent copper; sample "D-4" a zirconium-titanium powder with 12.1 weight percent nickel; sample "E-4" a zirconium-titanium powder with twelve weight percent copper; sample "F-4" a zirconium-titanium powder with 6.5 weight percent nickel; sample "G-4" Zircaloy-4 foil; and sample "H-4" Zircaloy-4 cladding material.

TABLE IV

| Sample | $D_2$ (ppm) | $D_2$ (cc) | $D_2$ (cc/gm sample) |
|---|---|---|---|
| A-4 | 4.3 | .0049 | .0241 |
| B-4 | 1413 | .325 | 7.92 |
| C-4 | 40 | .0051 | .224 |
| D-4 | 14 | .0018 | .079 |

TABLE IV-continued

| Sample | $D_2$ (ppm) | $D_2$ (cc) | $D_2$ (cc/gm sample) |
|---|---|---|---|
| E-4 | 16 | .0021 | .090 |
| F-4 | 8 | .0012 | .045 |
| G-4 | 6 | .0015 | .034 |
| H-4 | 2 | .0026 | .011 |

EXAMPLE V

Figure 7:
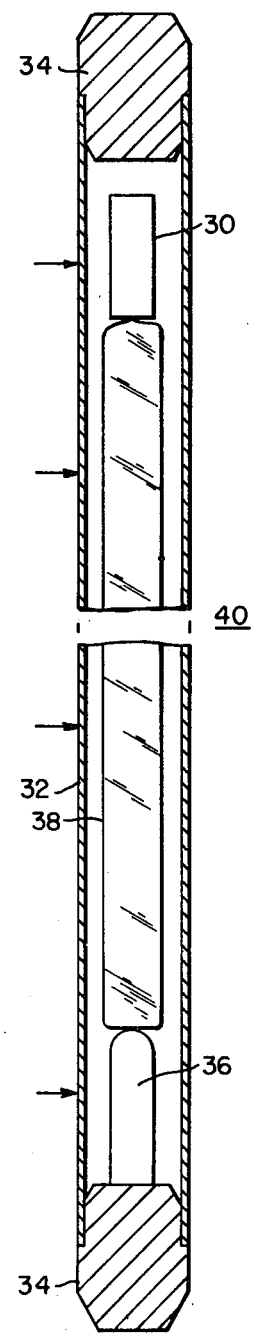
FIG. 7 is an elevation view, in partial cross section, of a test capsule.

Later tests were performed and arranged to simulate a reactor environment, including placing a tritium removal and retention test device 30 in competition with Zircaloy-4 cladding. A test apparatus was arranged, and is shown in FIG. 7. The test apparatus, referred to hereinafter as the "test capsule" 40, included fuel rod test cladding 32 of Zircaloy-4. The capsule 40 was approximately 11-½ inches in length. Also included in the test capsule 40 were end plugs 34 of Zircaloy-4, a test tritium removal and storage device 30, a deuterium gas generator 36, and a glass tube spacer 38. The test device 30 was a rod prepared as discussed above, with a nickel layer of twelve percent by weight, and was approximately one and one-half inches in length and 0.2 inches in outer diameter. As shown, it was placed in the upper end of the test capsule 40. At the lower end of the test capsule 40 was placed the deuterium generator 36. The generator 36 was approximately one inch in length with a 10 mil wall thickness of nickel and a 3/16 inch outside diameter. The generator 36 was made by taking a 3/16 inch diameter high purity nickel rod, and drilling the inside of the rod to give the desired wall thickness. The bottom surface of the nickel rod was not drilled through. Then, a controlled amount of deuteriated water ($D_2O$) was placed in the nickel shell. Also placed within the shell was high purity iron (Fe) wire, in coil form. While maintaining the lower portion of the deuterium generator 36 in a liquid nitrogen solution to solidify the deuteriated water, the upper portion of the nickel shell was welded shut. After cooling, the generator 36 was then placed in the lower portion of the test capsule 40, which previously had been sealed by welding on one of the end plugs 30. The tube spacer 38 was a sealed glass tube approximately 7-⅛ inch long that made a loose sliding fit with the test rod cladding 32. The test device 30 was then inserted in the capsule 40, and the upper end plug 34 was welded in place, sealing the capsule at approximately one atmosphere of helium. A second test capsule was constructed, the only difference being the inclusion of a capillary tube placed adjacent the test device 30. The capillary tube contained 260 micrograms ($\mu gm$) of water. The tube ruptured at test temperature, releasing high temperature water vapor.

To run the test, the capsule 40 was placed in a gradient furnace that heated the cladding wall 32 opposite the glass spacer 38 and the deuterium generator 36 to slightly higher temperature than the test device 30. The device 30 ran at approximately 320° C. while the cladding 32 wall temperature varied from 380° C. to 320° C. The higher temperature area was between the deuterium generator 36 and the device 30. The iron wire reacted with the deuteriated water to form a combination of $Fe_3O_4$ and $Fe_2O_3$ at approximately 300° C., and liberated the deuterium, which freely passed through the nickel wall of the generator 36. The glass spacer 38 formed a small annulus for transport of the deuterium to the test device 30, simulating the annulus between the fuel pellet 10 stack and the cladding 12 inside diameter in an actual fuel rod. The test was run in a controlled argon atmosphere that was monitored for escaping deuterium; none was observed. The test capsule was held at temperature for seven days, and then cooled to room temperature.

Multiple analyzes were then performed upon the test capsules. Puncture and recovery of the internal gas atmosphere showed the only gases present to be helium and traces of hydrocarbons. Hydrogen and deuterium analyzes were then performed on the test device 30 and at selected locations of the test cladding 32 represented by the arrows on FIG. 7. The results are summarized in Table V. The letter "H" denotes the capsule with the 260 $\mu gm$ of water addition.

TABLE V

| Capsule | Deuterium | | Hydrogen | |
|---|---|---|---|---|
| | 1 | 1H | 1 | 1H |
| Device | | | | |
| ppm, wt. | 7.0 | 5.3 | 22.9 | 35 |
| $\mu gm$ | 30.4 | 23.0 | 96.8 | 149 |
| percent | 51.6 | 55.1 | 22.9 | 36.2 |
| Cladding | | | | |
| ppm, wt. | 0.8 | 0.53 | 9.2 | 7.5 |
| $\mu gm$ | 28.1 | 18.6 | 323.0 | 262.0 |
| percent | 47.7 | 44.6 | 76.6 | 63.6 |
| Generator | | | | |
| ppm, wt. | 0.3 | 0.1 | 1.4 | 0.55 |
| $\mu gm$ | 0.4 | 0.2 | 2.0 | 0.8 |
| percent | 0.8 | 0.35 | 0.5 | 0.2 |

As shown from Table V, the test device 30 contained about 52 percent of the initial deuterium. Less than 1 percent of the deuterium remained in the generator 36. The tests further showed that the added moisture had very little effect on the ability of the device 30 to remove the deuterium. In fact, it increased the removal and retention of deuterium, by the device 30, by several percent. This is believed due to buildup of an oxide film on the inner surface of the test cladding wall 32. The film could be seen by visual inspection, and was especially evident in the upper area of the cladding 32, where the water was released. There was no such film on the device 30 itself, as there was no reaction with the protective adherent nickel layer. As there is typically excess moisture on the surface and within the fuel pellets 10 during manufacture, this same effect can be expected to be experienced during operation of the fuel within a reactor. An oxide film will be built up on the inner surface of the fuel cladding 12 early in the operating life of the fuel, thereby forming somewhat of a barrier to the interaction of tritium with the cladding 12. This will increase the efficiency of the tritium removal and retention device.

As a further result, the device 24 may perform a safety related function during plant operation. In the unlikely event that the cladding 12 of a fuel rod fails, reactor coolant water reacts with the inner surface of the fuel rod. The tritium removal and retention device 24 not only is inert to the coolant but also retains its inventory in the presence of steam formed by the reactor coolant. In the unlikely event of fuel rod failure, the device will act to absorb free hydrogen, and will not act to catalyze the incoming coolant water, as might an alloy type device.

Another benefit of the device 24 disclosed herein is its ability to provide a source of tritium relatively less expensive than obtaining tritium from an aqueous solution. Tritium has been used as a tracer element in many functions. It is also used in medical treatment. After a fuel rod containing the disclosed device is removed from a reactor, the device 24 can be easily removed and separately processed. Heating the device to a temperature in the range of 1100° C. in a vacuum maintained at $10^{-6}$ mm Hg releases the entrained tritium, and also any entrained hydrogen, in a gaseous phase. Separation of the tritium from this medium is significantly easier than separation from water.

It is therefore seen that the device disclosed herein provides a means to remove and store gaseous tritium. It is particularly applicable to use in nuclear fuel rods, where its function is not reduced by residual water vapor or other fission product gases within a rod. It further limits the reaction of tritium with the fuel rod cladding, and can be easily manufactured and incorporated in existing fuel rod types. It poses no additional problems in the unlikely event of fuel rod failure, and may provide tritium for medical, tracer, and other uses. It is apparent that many modifications and variations are possible in view of the above teachings. It therefore is to be understood that within the scope of the appended claims, the invention may be practiced other than as specifically described.

We claim:

1. A fuel rod for use in a nuclear reactor comprising a plurality of pellets composed of nuclear material, a tubular cladding enclosing said pellets, means hermetically sealing said rod, said clading having a clearance space with respect to the pellets, a plenum area within said rod, a tritium removal and storage device disposed within said plenum and separate from said cladding, said removal and storage device comprising an inner core of zirconium alloy and an adherent outer layer of a nickel alloy bonded to the exposed surfaces of said core, said outer layer being above five percent by weight of said removal and storage device.

2. A fuel rod for use in a nuclear reactor comprising a plurality of pellets composed of nuclear material, a tubular cladding enclosing said pellets, means hermetically sealing said rod, said cladding having a clearance space with respect to the pellets, an upper plenum above said pellets, said plenum surrounding a retention device, a tritium removal and storage device within said retention device, said removal and storage device comprising an inner core of a material selected from the group consisting of zirconium and alloys of zirconium and an adherent outer layer of a material selected from the group consisting of nickel and alloys of nickel bonded to all exposed surfaces of said core, said outer layer being above five percent by weight of said removal and storage device.

3. The fuel rod of claim 2 wherein said retention device comprises a spring with at least one affixed end cap.

4. A nuclear reactor core comprising a plurality of fuel rods, at least one of said rods including nuclear material, a tubular cladding enclosing said nuclear material, means for hermetically sealing said rod, a plenum area within said rod, a tritium removal and storage device disposed within said plenum and separate from said cladding, said device comprising an inner core of a material selected from the group consisting of zirconium and alloys of zirconium and an adherent outer layer of a material selected from the group consisting of nickel and alloys of nickel, said outer layer being bonded to substantially all exposed surfaces of said inner core and having a thickness of between 0.01 and 0.03 inch.

5. A nuclear fuel assembly for use in a nuclear reactor comprising a plurality of fuel rods, at least one of said rods including a plurality of pellets of nuclear material, a tubular cladding enclosing said pellets, means hermetically sealing said rod, said cladding having a clearance space with respect to said pellets, a plenum area within said rod, a tritium removal and storage device disposed within said plenum and separate from said cladding, said device having an inner core of a material selected from the group consisting of zirconium and alloys of zirconium and an adherent outer layer of a material selected from the group consisting of nickel and alloys of nickel bonded to a substantial portion of the exposed surfaces of said inner core.

6. In a method of producing a nuclear fuel rod the improvment comprising placing a plurality of nuclear fuel pellets within a tubular cladding so as to provide a clearance space between said pellets and cladding and a plenum area within said cladding, placing a tritium removal and storage device within said plenum and separate from said cladding, said device having an inner core of a material selected from the group consisting of zirconium and alloys of zirconium and an outer layer of a material selected from the group consisting of nickel and alloys of nickel bonded to said core, said outer layer being above five percent by weight of said device, and hermetically sealing said pellets and device within said cladding.

7. The fuel rod of claim 2 wherein said outer layer is between eight and twelve percent by weight of said device.

8. A nuclear fuel rod comprising a plurality of pellets of nuclear material, a tubular cladding enclosing said pellets, means hermetically sealing said cladding, said cladding having a clearance space with respect to said pellets, a plenum area within said rod containing gases, a tritium removal and storage device, said device having an inner core of a material selected from the group consisting essentially of zirconium and alloys of zirconium and an adherent outer layer of a material selected from the group consisting essentially of nickel and alloys of nickel bonded to a substantial portion of the exposed surfaces of said inner core, said device disposed within said plenum such that gases within said plenum are exposed directly to said outer layer and substantially insulated from direct contact with said inner core by said outer layer.

9. A core for a nuclear reactor, said core including a plurality of nuclear fuel assemblies, said assemblies including a plurality of fuel rods, at least one of said rods comprising a plurality of pellets of nuclear material, a tubular cladding enclosing said pellets, means hermetically sealing said rod, said cladding having a clearance space with respect to said pellets, a plenum area within said rod, a tritium removal and storage device disposed within said plenum and separate from said cladding, said device having an inner core of a material selected from the group consisting essentially of zirconium and alloys of zirconium and an adherent outer layer of a material selected from the group consisting essentially of nickel and alloys of nickel bonded to a substantial portion of the exposed surfaces of said inner core.

* * * * *